US006223410B1

(12) United States Patent
Sroka

(10) Patent No.: US 6,223,410 B1
(45) Date of Patent: May 1, 2001

(54) PULLING DEVICE

(76) Inventor: John S. Sroka, 5055 Timber Edge Dr., Richfield, OH (US) 44286

( * ) Notice: Subject to any disclaimer, the term of this patent is extended or adjusted under 35 U.S.C. 154(b) by 0 days.

(21) Appl. No.: 09/415,490

(22) Filed: Oct. 12, 1999

(51) Int. Cl.[7] .................................................... B23P 19/04
(52) U.S. Cl. ............................................................... 29/261
(58) Field of Search ............................ 29/261, 258, 259, 29/262, 260

(56) References Cited

U.S. PATENT DOCUMENTS

| | | | | |
|---|---|---|---|---|
| 4,059,883 | * | 11/1977 | Osborne | 29/259 |
| 4,744,132 | * | 5/1988 | Greene et al. | 29/261 |
| 5,159,743 | * | 11/1992 | Somerville | 29/261 |
| 5,896,639 | * | 4/1999 | Chen | 29/261 |

* cited by examiner

*Primary Examiner*—Robert C. Watson
(74) *Attorney, Agent, or Firm*—Pearne & Gordon LLP

(57) ABSTRACT

A pulling device for removing gears, bearings, sprockets, etc. from the shafts on which they are mounted is disclosed. The pulling device comprises a housing, a laterally movable shaft received within the housing, and a pressure transmitting member interposed between the laterally movable shaft and the housing. The pressure transmitting member is rotatable by means of handles attached to a torque ring mounted on the end thereof. By rotating the pressure transmitting member, the laterally movable shaft, which does not rotate, moves laterally with respect to the pressure transmitting member within the housing of the pulling device. Jaws are attached at substantially equal angular increments to a collar which surrounds the housing and the ends of the jaws engage the underside of the part or component being removed. Since the jaws engage the part at a plurality of angular locations and inasmuch as the laterally movable shaft does not rotate as the pressure transmitting member is rotated, the laterally movable shaft does not “walk across” the end of the shaft on which the part or component being removed is mounted.

3 Claims, 5 Drawing Sheets

PULLING DEVICE

TECHNICAL FIELD

The present invention relates, in general, to a pulling device for removing parts or components from a shaft, or the like, and, more particularly, to an improved pulling device that securely grips the part or component being removed and does not move across the surface of the shaft or the part during the removal process.

BACKGROUND ART

Pulling devices for removing gears, bearings, sprockets, etc. from shafts on which they are mounted are readily available. Such pulling devices typically utilize a pair of oppositely disposed jaws which are received over the outer periphery of the part or component being removed and grip the underside thereof during the removal process. Typically, such pulling devices have a central shaft which moves laterally with respect to the jaws and whose end contacts and rotates against the end of the shaft on which the part or component is mounted. In this manner, a force is applied to the underside of the part or component causing the part or component to move towards the end of the shaft on which it is mounted. Since the central shaft of the pulling device contacts and rotates against the end of the shaft on which the part or component is mounted, the end of the central shaft has a tendency to "walk across" the surface of the end of the shaft on which the part or component is mounted. When this occurs, the orientation of the pulling device becomes skewed with respect to the shaft on which the part or component is mounted causing the pulling device to become disengaged from the part or component being removed.

In view of the foregoing problems associated with presently available pulling devices, it has become desirable to develop a pulling device which securely grips either the outer periphery or the inner periphery of the part or component being removed and which, during the removal process, does not "walk across" the end of the shaft on which the part or component is mounted.

SUMMARY OF THE INVENTION

The present invention solves the problems associated with the prior art pulling devices and other problems by providing a pulling device which securely grips the part or component being removed and which does not "walk across" the surface of the shaft on which the part or component is mounted. The pulling device of the present invention is comprised of a pressure transmitting member interposed between a threaded central shaft and the housing of the pulling device. The pressure transmitting member is rotatable by means of handles attached to a torque ring which is mounted on the outer end of the pressure transmitting member. By rotating the pressure transmitting member, the threaded central shaft, which does not rotate, moves laterally with respect to the pressure transmitting member and the housing of the pulling device. The end of the threaded central shaft engages the end of the shaft on which the part or component is mounted. Jaws are attached at 120 degree angular increments to a collar which surrounds the housing, and the ends of the jaws engage the underside of the part or component being removed. Such engagement can occur either along the outer periphery of the part or component or the inner periphery thereof. Since the jaws are attached to the collar assembly at 120 degree angular increments, the pulling device securely engages the part or component being removed preventing the orientation of the pulling device from becoming skewed during the removal process. In addition, since the threaded central shaft of the pulling device does not rotate, but only moves laterally with respect to the housing and the ends of the jaws of the pulling device, the end of the threaded central shaft does not "walk across" the end of the shaft on which the part or component is mounted.

DESCRIPTION OF THE PREFERRED EMBODIMENT

Figure 1:
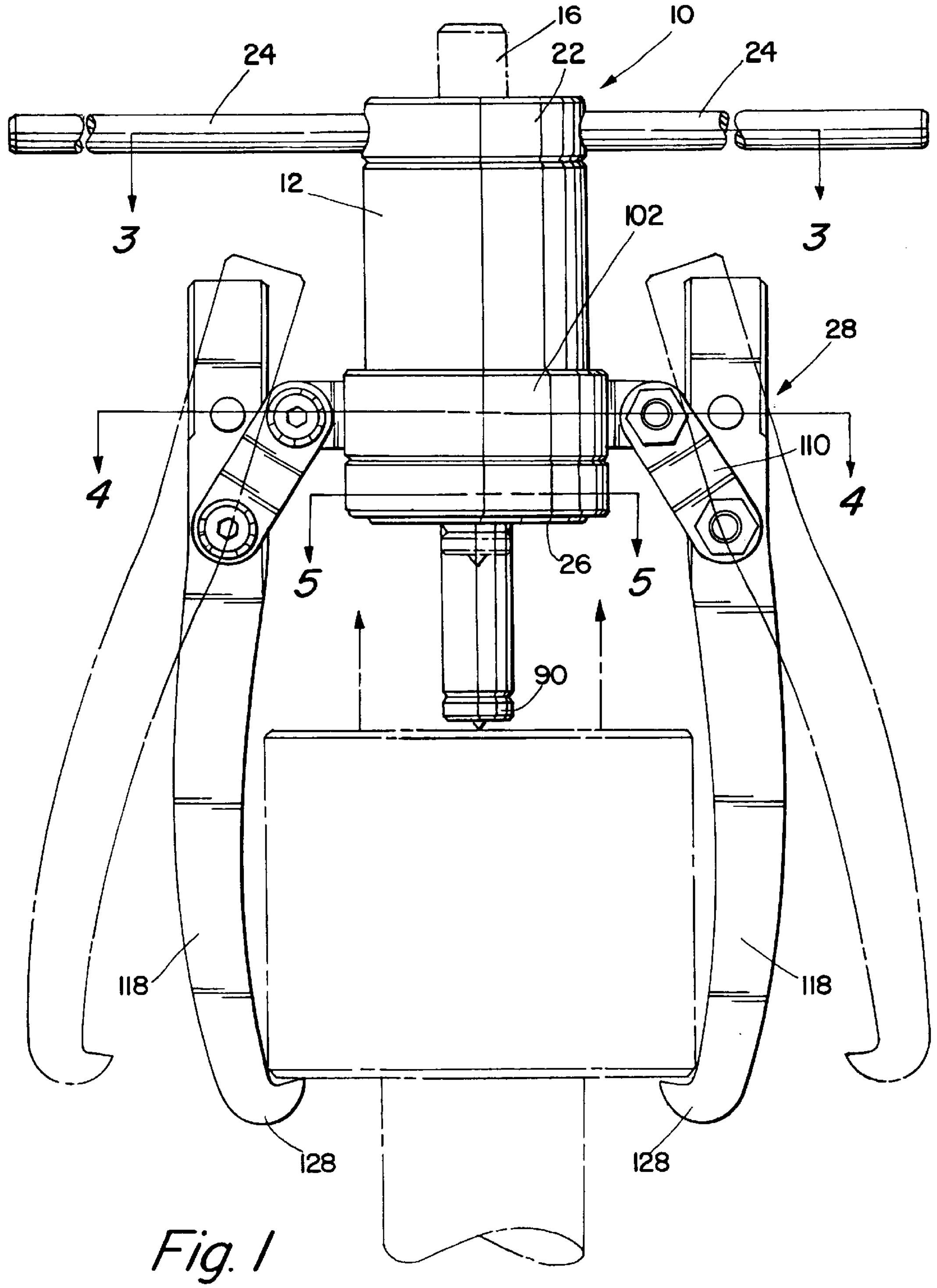
FIG. 1 is a front elevational view of the pulling device of the present invention showing the positions of the jaws in a disengaged and an engaged condition against the outer periphery of the part or component being removed.
Figure 2:
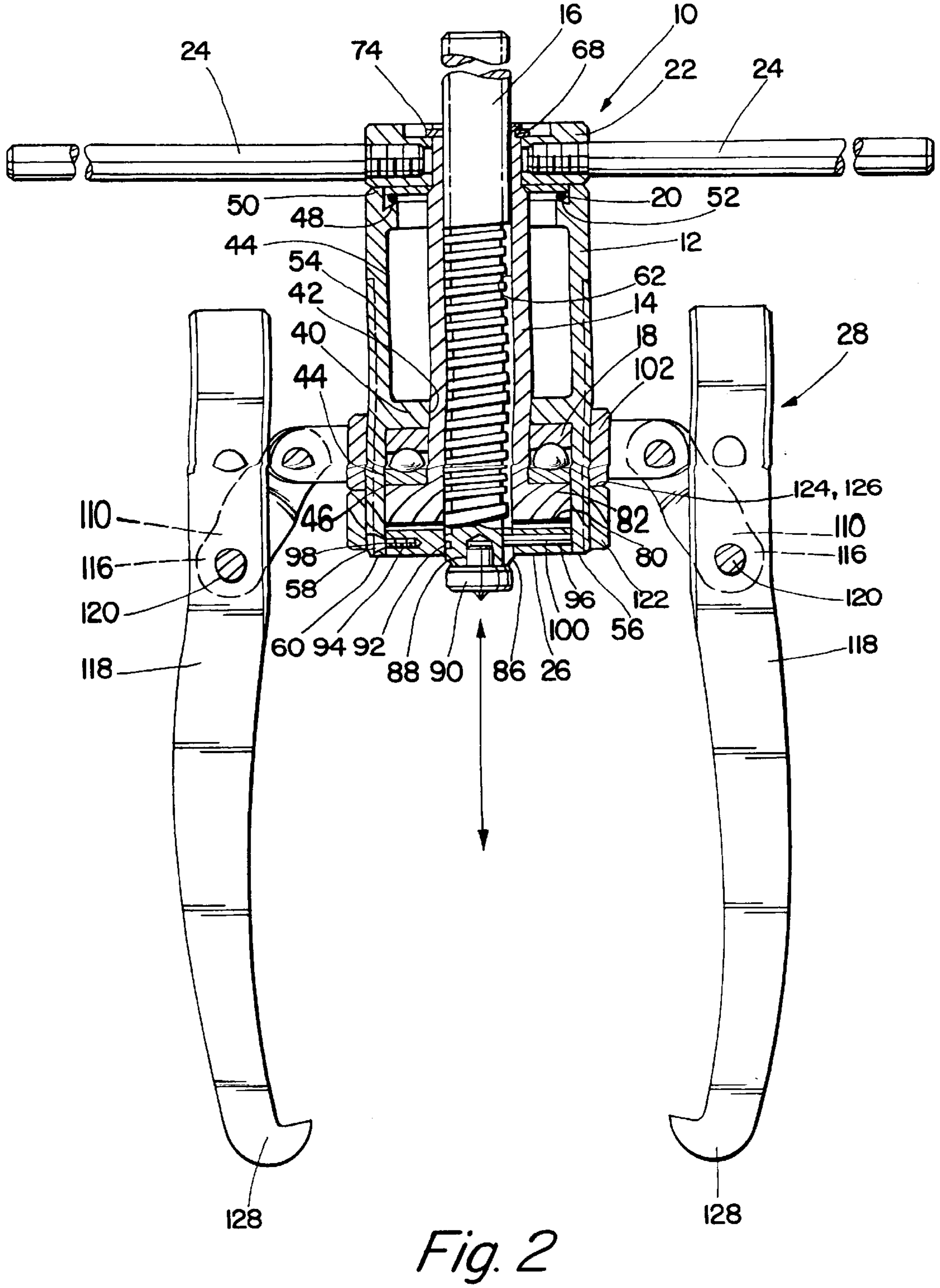
FIG. 2 is a cross-sectional view of the pulling device of the present invention taken across section-indicating lines 2—2 in FIG. 3.

Referring now to the drawings where the illustrations are for the purpose of describing the preferred embodiment of the present invention and are not intended to limit the invention described herein, FIG. 1 is a front elevational view and FIG. 2 is a cross-sectional view of the pulling device 10 of the present invention. The pulling device 10 is comprised of a housing 12, a pressure transmitting member 14, a threaded shaft 16, ball bearings 18, 20, a torque ring 22, handles 24, an anti-rotation ring 26, and a jaw assembly shown generally by the numeral 28.

The housing 12 is generally circular in cross-section and is provided, at its approximate mid-point along its longitudinal axis, with an inwardly directed flanged surface 40 having a bore 42 therethrough. Flanged surface 40 and the inner surface 44 of housing 12 define a pocket 46 for the receipt of ball bearing 18 which has an inner diameter which approximates the diameter of bore 42. Another inwardly directed flanged surface 48 is provided adjacent end 50 of housing 12 defining a pocket 52 between flanged surface 48 and the inner surface 44 of housing 12 for the receipt of ball bearing 20. The outer surface of housing 12 is provided with an acme thread 54 commencing adjacent end 56 of housing 12 and continuing for a portion of the length of housing 12. A bore 58 is provided adjacent end 56 of housing 12 through the wall 60 defining housing 12.

Figure 3:
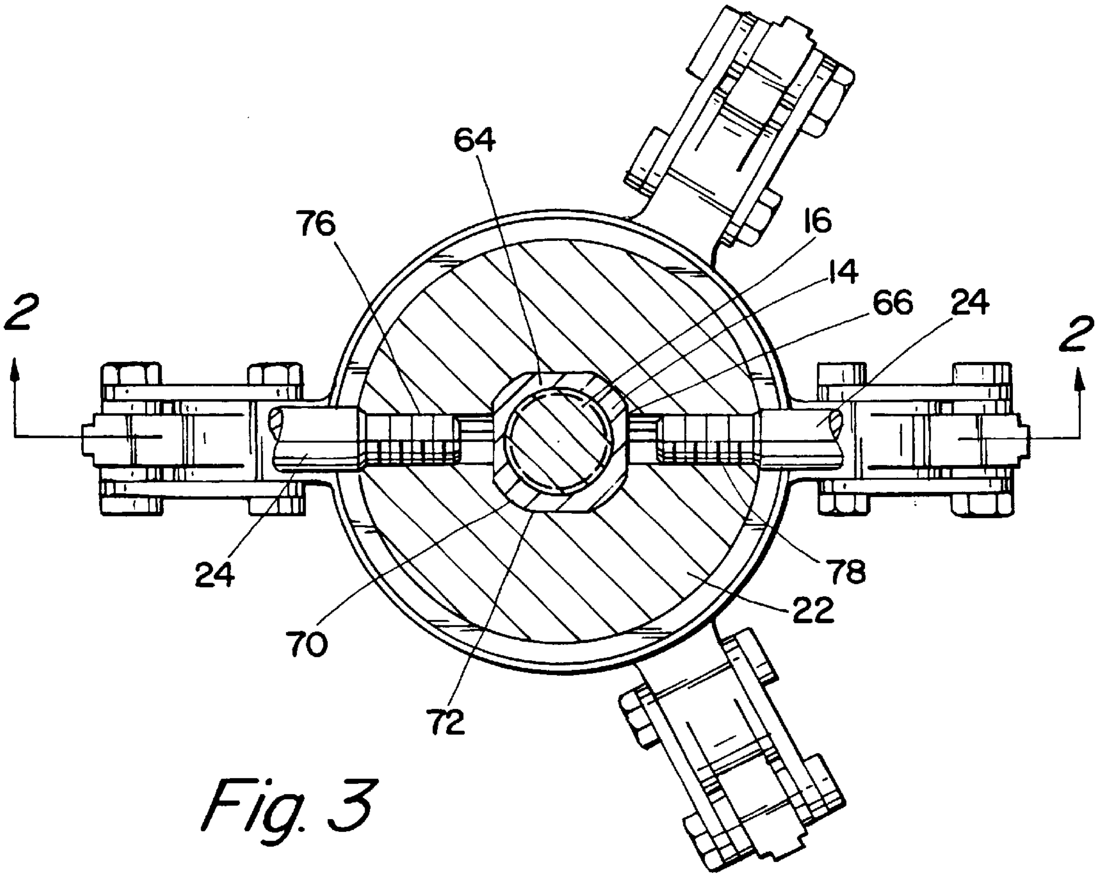
FIG. 3 is a cross-sectional view of the pulling device of the present invention taken across section-indicating lines 3—3 in FIG. 1.

Pressure transmitting member 14 is generally circular in configuration and has a bore 62 passing therethrough. One end 64 of pressure transmitting member 14 has oppositely disposed flats 66 thereon, as shown in FIG. 3, and has a circumferential slot 68 therein. Torque ring 22 is received on end 64 of pressure transmitting member 14 and has bore 70 therethrough with complementary internal flats 72 therein to grippingly engage end 64 of pressure transmitting member 14 and flats 66 thereon. A retaining ring 74 is received within circumferential slot 68 in end 64 of pressure transmitting member 14 after torque ring 22 has been received thereon, as shown in FIG. 2. Torque ring 22 is provided with oppositely disposed threaded bores 76, 78 for the receipt of handles 24. The opposite end 80 of pressure transmitting member 14 is provided with a circumferential flanged surface 82 having an outer diameter slightly smaller than the diameter of pocket 46 in housing 12. Ball bearing 18 is received in pocket 46 and is interposed between circumferential flanged surface 82 on pressure transmitting member 14 and inwardly directed flanged surface 40 on housing 12.

Figure 5:
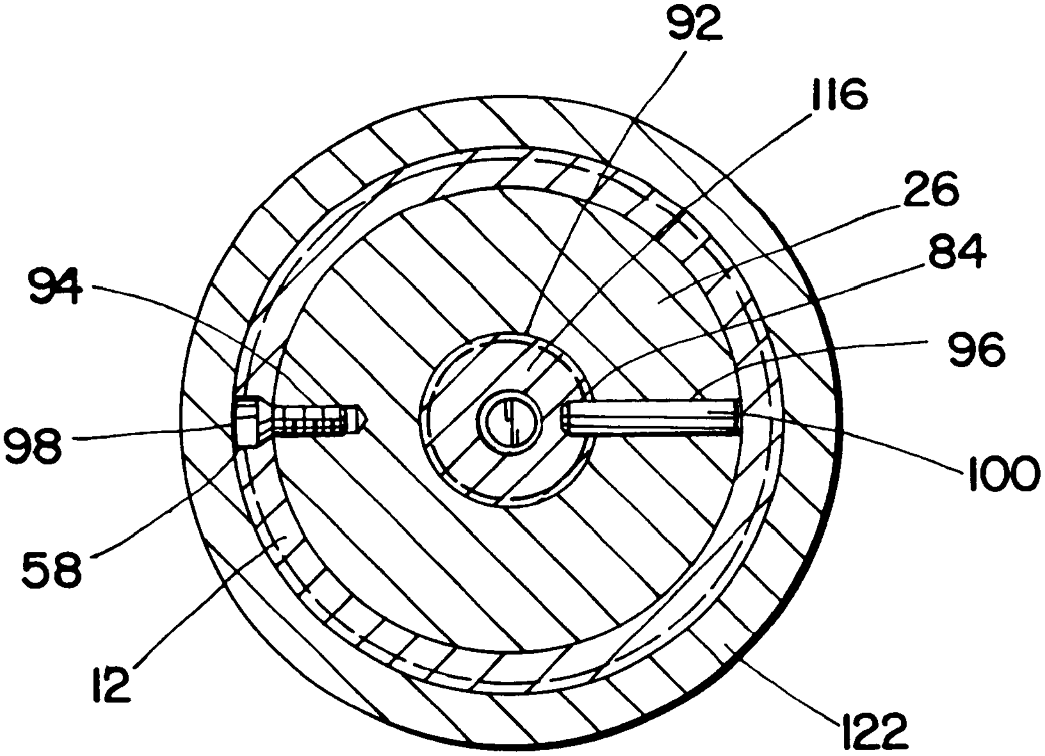
FIG. 5 is a cross-sectional view of the pulling device of the present invention taken across section-indicating lines 5—5 in FIG. 1.

Threaded shaft 16 is threaded throughout its length and has a keyway 84, as shown in FIG. 5, commencing adjacent end 86 of shaft 16 and extending for a portion of the length of shaft 16, as shown in FIG. 2. A blind bore 88 is provided in end 86 of threaded shaft 16. A pointer or centering member 90 may be received in blind bore 88 in end 86 of threaded shaft 16.

Anti-rotation ring 26 has a threaded bore 92 therethrough and is provided with a threaded bore 94 and an oppositely disposed through bore 96. Ring 26 is threadably received on end 86 of shaft 16. Screw 98 is provided through bore 58 in wall 60 of housing 12 and is received within threaded bore 94 in anti-rotation ring 26 securing housing 12 to ring 26. A pin 100 is received within bore 96 in anti-rotation ring 26 and its end is received within keyway 84 in threaded shaft 16 preventing threaded shaft 16 from rotating with respect to ring 26, as shown in FIG. 5.

Figure 4:
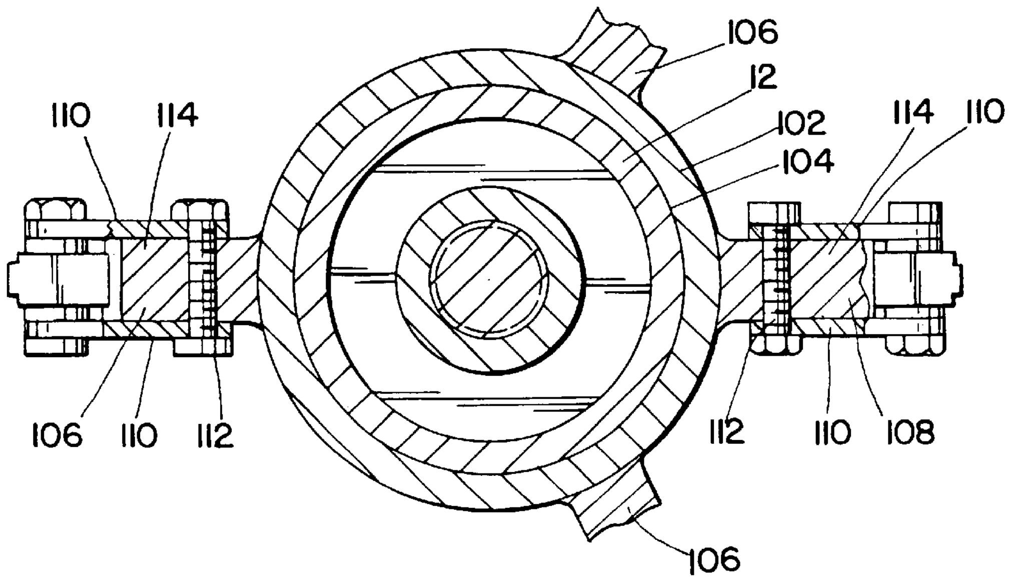
FIG. 4 is a cross-sectional view of the pulling device of the present invention taken across section-indicating lines 4—4 in FIG. 1.

Jaw assembly 28 is comprised of a collar 102 having a bore 104 therethrough with a diameter slightly greater than the outer diameter of housing 12, as shown in FIG. 4. A plurality of devises 106 are provided around the periphery of collar 102 and are angularly positioned approximately 120 degrees apart. An additional clevis 108 is positioned between two adjacent devises 106, as shown in FIGS. 3 and 4. Oppositely disposed connecting links 110 are attached to each of the devises 106, 108 by means of a fastener 112 received through an end 114 of the links. The opposite end 116 of each pair of connecting links 110 is attached to a jaw 118 by means of a fastener 120, as shown in FIG. 2. Because of the positioning of the devises 106, three jaws 118 can be attached to the collar 102 at 120 degree angular increments. Similarly, by using only clevis 108 and its oppositely disposed clevis 106, two oppositely disposed jaws 118 can be attached to collar 102.

A threaded nut 122 is received on end 56 of housing 12 and is positioned so that its top surface 124 contacts the bottom surface 126 of collar 102. In this manner, the position of the collar 102 with respect to housing 12 can be adjusted, and after adjustment, collar 102 cannot move downwardly with respect to housing 12.

In use, the pulling device 10 is positioned so that pointer or centering member 90 is located on the approximate center of the shaft on which the component or part to be removed is mounted. Alternatively, the pointer or centering member 90 can be removed and if a male projection exists on the end of the shaft on which the part or component to be removed is mounted, the male projection can be received within blind bore 88 in end 86 of threaded shaft 16. The end 128 of each jaw 118 is then received over the outer periphery of the component or part to be removed and placed under the surface thereof, as shown in FIG. 1. By gripping the handles 24 and rotating the torque ring 22, the pressure transmitting member 14 is rotated with respect to both the housing 12 and the threaded shaft 16. Rotation of the torque ring 22 by the handles 24 causes the threaded shaft 16 to move laterally with respect to the pressure transmitting member 14 causing the pointer or the centering member 90, or the end 86 of the threaded shaft 16 if a pointer or centering member 90 is not utilized, to move laterally toward the end 128 of the jaws 118 causing the jaws 118 to apply a pulling force on the part or component with respect to the shaft on which it is mounted or attached. In this manner, the part or component can be easily removed from the shaft on which it is mounted or attached.

Figure 6:
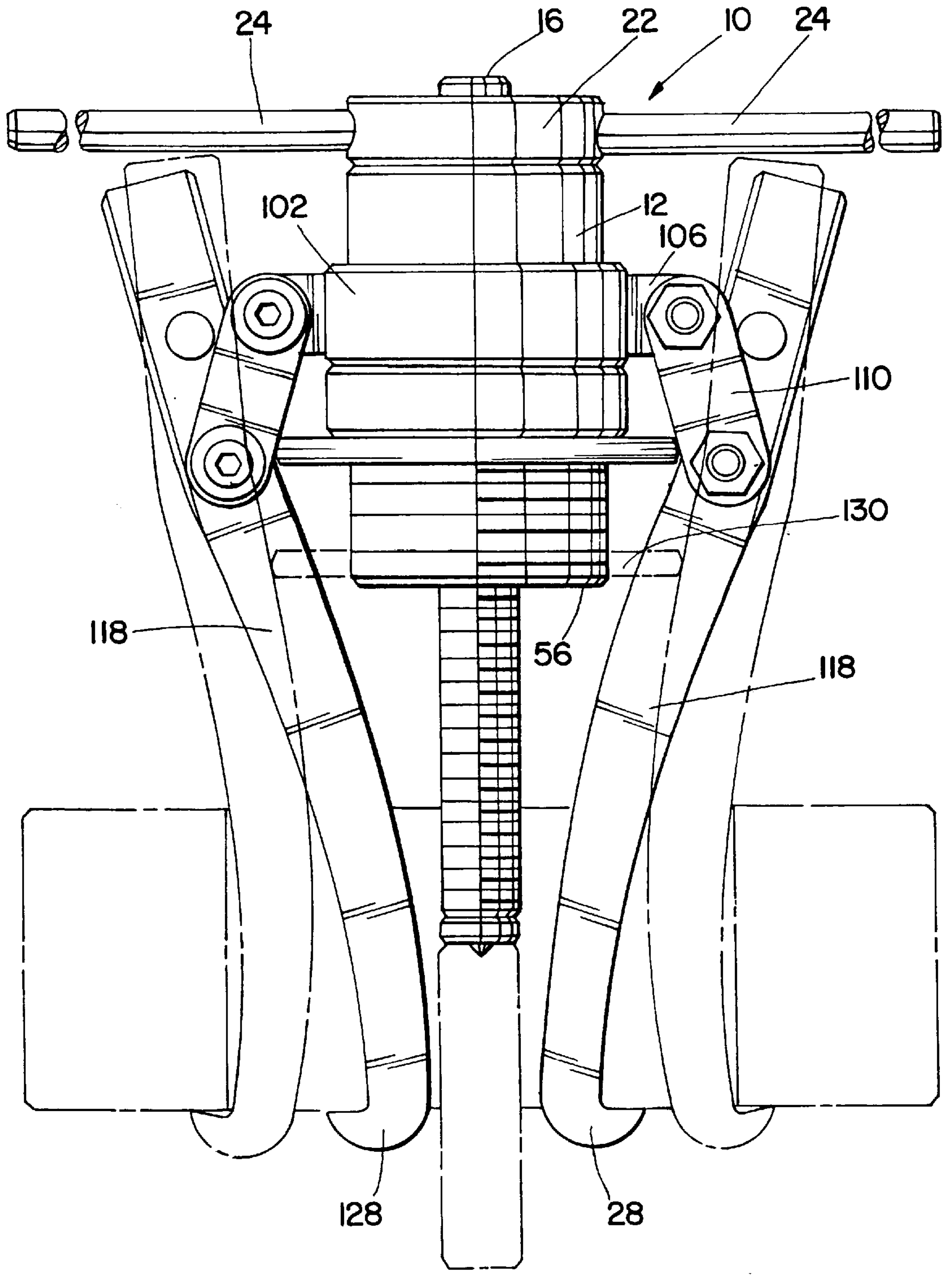
FIG. 6 is a front elevational view of the pulling device of the present invention showing the positions of the jaws in a disengaged and an engaged condition against the inner periphery of the part or component being removed.

The jaws 118 can be reversed so that the ends 128 thereof grip the inner periphery, rather than the outer periphery, of the part or component being pulled, as shown in FIG. 6. In this case, an adjusting ring 130 is threadably received on end 56 of housing 12 in order to bias the jaws 118 outwardly so that their ends 128 grip the inner periphery of the part or component being removed.

The pulling device 10 of the present invention offers a number of advantages over presently available pulling devices. For example, since the threaded shaft 16 does not rotate and is stationary with respect to pressure transmitting member 14, the end 86 of threaded shaft 16 does not "walk across" the surface of the shaft on which the part or component being removed is mounted. Thus, the pulling device 10 of the present invention is more securely positioned on the part or component being removed. In addition, the collar 102 provides for three jaws 118, rather than two jaws as used in present designs. The three jaws 118 are positioned approximately 120 degrees apart and provide for a more secure attachment of the pulling device 10 to the part or component being removed. In addition, the jaws 118 can be reversed so as to grip the inner periphery of the part or component being removed, rather than the outer periphery of same. Furthermore, the use of bearings 18, 20, which act as thrust bearings, significantly reduces the amount of force required to remove the part or component from the shaft on which it is mounted. Lastly, the overall length of the pulling device 10 can be readily changed to compensate for different thickness of parts or components that require removal from shafts.

Certain modifications and improvements will occur to those skilled in the art upon reading the foregoing. It is understood that all such modifications and improvements have been deleted herein for the sake of conciseness and readability, but are properly within the scope of the following claims.

I claim:

1. A pulling device comprising:

a generally cylindrical housing having an inner surface, an upper end and a lower end, said housing having a housing flange extending radially inward from said inner surface to define a housing bore;

a pressure transmitting member extending through said housing bore and having a lower flange at a lower end between said housing lower end and said housing flange, said pressure transmitting member having a threaded bore therethrough;

a thrust bearing positioned between said lower flange and said housing flange;

a threaded shaft engaging and extending through said threaded bore of said pressure transmitting member;

means to prevent relative rotation between said housing and said threaded shaft; and a handle on said pressure transmitting means at said housing upper end.

2. A pulling device according to claim 1, further comprising a plurality of jaws connected to and symmetrically extending radially from said housing.

3. A pulling device according to claim 1, further comprising a centering member connected to said threaded shaft.

* * * * *

UNITED STATES PATENT AND TRADEMARK OFFICE

CERTIFICATE OF CORRECTION

PATENT NO. : 6,223,410 B1
DATED : May 1, 2001
INVENTOR(S) : John S. Sroka

It is certified that error appears in the above-identified patent and that said Letters Patent is hereby corrected as shown below:

Column 3,
Lines 26, 29, 31, and 35, delete "devices" and insert -- clevices --.

Signed and Sealed this

First Day of January, 2002

*Attest:*

JAMES E. ROGAN
*Director of the United States Patent and Trademark Office*

*Attesting Officer*